(12) United States Patent
Detering

(10) Patent No.: US 8,021,123 B2
(45) Date of Patent: Sep. 20, 2011

(54) COMPRESSOR UNIT WITH A DAMPED PRESSURE GAUGE

(75) Inventor: Rainer Detering, Seeize (DE)

(73) Assignee: Continental Aktiengesellschaft, Hanover (DE)

(*) Notice: Subject to any disclaimer, the term of this patent is extended or adjusted under 35 U.S.C. 154(b) by 205 days.

(21) Appl. No.: 12/423,321

(22) Filed: Apr. 14, 2009

(65) Prior Publication Data
US 2009/0196766 A1 Aug. 6, 2009

Related U.S. Application Data

(63) Continuation of application No. PCT/EP2007/060206, filed on Sep. 26, 2007.

(30) Foreign Application Priority Data
Nov. 11, 2006 (DE) .......................... 10 2006 053 247

(51) Int. Cl.
*F04B 49/00* (2006.01)
*G01L 7/00* (2006.01)
(52) U.S. Cl. ................ 417/63; 73/707; 73/756
(58) Field of Classification Search .................... 417/63; 73/707, 714, 756
See application file for complete search history.

(56) References Cited

U.S. PATENT DOCUMENTS

| | | | | |
|---|---|---|---|---|
| 2,986,938 A * | 6/1961 | Grandstaff | ...................... | 73/706 |
| 4,413,524 A * | 11/1983 | Kosh | .............................. | 73/707 |
| 5,655,887 A | 8/1997 | Chou | | |
| 6,783,333 B2 * | 8/2004 | Wang | ............................. | 417/307 |
| 2008/0056922 A1 * | 3/2008 | Huang | ......................... | 417/559 |

FOREIGN PATENT DOCUMENTS

| | | |
|---|---|---|
| DD | 254648 A1 | 3/1988 |
| DE | 746797 C | 12/1944 |
| DE | 930895 C | 7/1955 |
| GB | 464 686 | 4/1937 |
| JP | 58-132640 A | 8/1983 |

OTHER PUBLICATIONS

International Search Report dated Jan. 24, 2008.

* cited by examiner

*Primary Examiner* — Charles G Freay
(74) *Attorney, Agent, or Firm* — Lawrence A. Greenberg; Werner K. Stemer; Ralph E. Locher

(57) ABSTRACT

A compressor unit is particularly suitable for compressing air in portable and/or transportable devices. The compressor unit includes a motor, a compressor, and a pressure gauge (manometer). The pressure gauge is connected to the compressor unit through a threaded connection and the supply of the pressure medium to the pressure gauge travels through the threads.

7 Claims, 1 Drawing Sheet

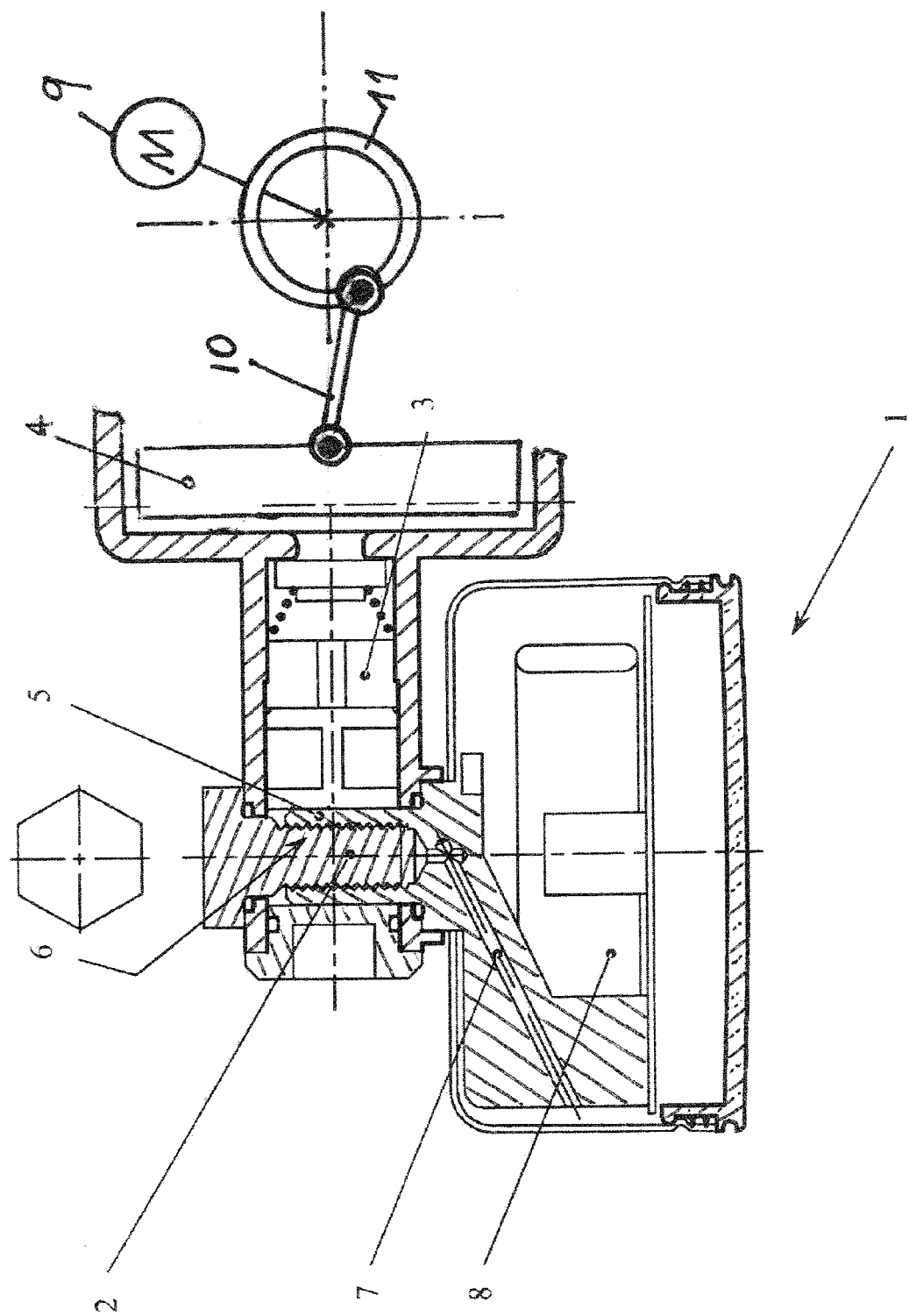

COMPRESSOR UNIT WITH A DAMPED PRESSURE GAUGE

CROSS-REFERENCE TO RELATED APPLICATION

This is a continuation application, under 35 U.S.C. §120, of copending international application No. PCT/EP2007/060206, filed Sep. 26, 2007, which designated the United States; this application also claims the priority, under 35 U.S.C. §119, of German patent application No. DE 10 2006 053 247.3, filed Nov. 11, 2006; the prior applications are herewith incorporated by reference in their entirety.

BACKGROUND OF THE INVENTION

Field of the Invention

The invention relates to a compressor unit, in particular for compressing air within portable/transportable devices, which comprises at least a motor, a compressor and a pressure gauge. Such compressor units often contain a simple compressor, embodied for example as a reciprocating piston compressor driven by way of a slider crank mechanism. The slider crank mechanism is composed here of a crank wheel and of a connecting rod connected to the crank wheel and to a piston.

Pressure gauges as measuring devices in/on pressure systems are sensitive to pressure surges. While the effect of relatively large pressure surges on the measuring elements is reduced by suitable hydraulic boosters or restrictors in high-pressure pressure systems which are protected in a costly way, the pressure surges in small pressure systems are often apparent as a result of continuous trembling of the pointer on the pressure gauge, making it extremely difficult to take a reading. This is the case in particular in the case of pressure generators in the form of pulses, such as for example when pressure is generated by a reciprocating piston compressor.

German patent publication DD 254 648 A1 discloses a device for damping pressure fluctuations at a pressure gauge, in which device the pressure-conducting line is connected to the pressure gauge via a piston which acts on two chambers that are filled with silicone oil. The two chambers are in turn connected to one another via a throttling point/throttling opening. The pressure of the medium in the pressure-conducting line acts on the piston and displaces it, as a result of which one of the chambers is made smaller. The expelled volume flows via the throttling point into the second chamber and raises the pressure which acts there on the pressure gauge diaphragm which partially bounds the second chamber. The throttling causes the pressure peaks/pressure surges in the pressure-conducting line to be damped and prevents them from being passed on to the pressure gauge's diaphragm, as a result of which the line pressure can be displayed in a relatively constant fashion. However, for reasons of cost, the embodiment shown here, with its relatively complicated design, cannot be used for extremely simple pressure gauges which are manufactured in large numbers.

Compressor units for compressing air, in the form of portable/transportable devices, that is to say mini-compressors, for example for inflating car tires or inflatable boats, require, for reasons of cost, pressure gauges of this type which are easy to manufacture and are generally equipped with extremely simple reciprocating piston compressors which per se continuously generate pressure peaks/pressure surges. In this context, the pressure peaks/pressure surges in the pressure-conducting line are often throttled in such a way that a stopper connection is provided in the feed line to the pressure gauge, which stopper connection is intentionally designed to close tight to a greater or lesser degree and is intended to prevent the effect of pressure surges on the pressure gauge as a result of the gap throttling produced in the leak. However, the throttling which is achieved here in particular in devices which are extremely inexpensive to manufacture depends essentially on random "sealing configurations" owing to tolerances which are present at that particular time, and it cannot generally prevent the pointer of the pressure gauge from trembling.

SUMMARY OF THE INVENTION

It is accordingly an object of the invention to provide a compressor unit with a damped pressure gauge which overcomes the above-mentioned disadvantages of the heretofore-known devices and methods of this general type and which provides for a compressor unit with a pressure gauge, in particular for compressing air with a reciprocating piston compressor within portable/transportable devices, which has a reliably reproducible damping effect for a pressure gauge which is then virtually unaffected by pressure surges/pressure peaks and from which a reading can be taken safely and without trembling of the pointer, and in which the damping function can be manufactured in an extremely simple way.

With the foregoing and other objects in view there is provided, in accordance with the invention, a compressor unit, in particular an air compressor unit for a portable device. The unit comprises:

a compressor and a motor for driving the compressor;

a pressure gauge for indicating a pressure generated by the compressor;

a threaded connection with threads forming a connection between the pressure gauge and the compressor unit, wherein a pressure medium is supplied from the compressor to the pressure gauge through the threads.

In other words, the pressure gauge is connected here to the compressor unit via a threaded connection, wherein the pressure medium is supplied to the pressure gauge through the threads. This results in a structurally very simple design of the restrictor through integrating the throttling function into a connecting component which is already present and necessary, specifically into the screw thread for connecting the pressure gauge to the pressure line. Fewer and simpler components are required, which allows the manufacturing costs to be reduced despite a good quality level. The structure is, moreover, insensitive to fabrication tolerances and thermal influences.

In accordance with an added feature of the invention, the compressor is a reciprocating piston compressor driven by way of a slider crank mechanism, wherein the slider crank mechanism is composed of a crank wheel and of a connecting rod connected to the crank wheel and to a piston, and in that the pressure gauge is assigned to the high-pressure-side outlet line of the reciprocating piston compressor and is connected to the outlet line via a threaded connection. In such an embodiment with a simple reciprocating piston compressor continuously generating pressure peaks/pressure surges, the advantages of the invention are particularly clear since virtually complete throttling of the pressure peaks/pressure surges can be achieved. The pressure which is important for the user in, for example, the inflatable object, which usually has to be monitored carefully, can therefore be read without trembling of the pointer.

A further advantageous development consists in the fact that the thread length and the gap between the tip of the thread and the root of the thread is embodied in such a way that pressure surges in the pressure gauge are damped. As a result, even when commercially available threads are used, the throttling effect can easily be changed by changing the corresponding other parts of the geometry of the thread, i.e. the diameter of the thread and screw-in depth or thread length. For example, the throttling effect can be preset and secured in any desired way by providing stops which bound the screw-in depth.

A further advantageous development consists in the fact that the material pairing in the thread is formed in a corrosion-preventing fashion. This prevents the throttling cross section of the thread changing or even entirely closing as a result of corrosion deposits. In this context, in particular identical materials are advantageous. Pairings with at least one plastic part/plastic thread are also suitable here.

A further advantageous development consists in the fact that an equalizing volume is arranged upstream of the threaded connection in the direction of flow. Such an equalizing volume additionally increases the damping and therefore homogenizes the pressure surges acting on the pressure gauge. In this context, a further advantageous and particularly easily implemented development consists in the fact that the equalizing volume is generated by a nozzle arrangement upstream of the threaded connection in the direction of flow.

Other features which are considered as characteristic for the invention are set forth in the appended claims.

Although the invention is illustrated and described herein as embodied in a compressor unit having a damped pressure gauge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic cross section taken through an exemplary embodiment of a device according to the invention.

DETAILED DESCRIPTION OF THE INVENTION

Referring now to the sole FIGURE of the drawing in detail, there is shown a pressure gauge 1, also referred to as a manometer 1, which is connected via a threaded connection 2 to the outlet line 3 of a compressor unit. The compressor unit, which is not illustrated in detail for reasons of clarity, has a reciprocating piston compressor 4, which is driven by a motor 9 that connects to the piston by way of a slider crank mechanism 10, 11. The slider crank mechanism includes a crank wheel 11 that is driven by the motor and a connecting rod 10 that connects to the piston. Accordingly, the compressor unit continuously generates pressure surges in the form of pulses.

Through the thread gap between an internal thread 5 and an external thread 6 of the threaded connection 2, the pressure medium is fed to a line 7, which is located within the pressure gauge and is connected to a tubular coil 8 to which internal pressure is applied and which constitutes here a measuring device/measuring coil of the pressure gauge 1. The expansion or rotation of the measuring coil which is generated by the internal pressure in the tubular coil is transmitted to a pressure gauge pointer. It should be understood, of course, that such measuring devices can also be embodied as diaphragm pressure gauges.

The embodiment shown here constitutes a compressor unit which is easy and cost-effective to manufacture and has a pressure gauge which reacts with tolerance to fluctuations in pressure and which can be read without trembling of its pointer.

The invention claimed is:

1. A compressor unit, comprising:
a compressor and a motor for driving said compressor;
a pressure gauge for indicating a pressure generated by said compressor said pressure gauge including an interior passage with threads forming a threaded connection for securing the pressure gauge to the compressor unit;
said threaded connection forming a fluid connection between said pressure gauge and said compressor unit, wherein said threads have tips and roots and a pressure medium is supplied from said compressor to said gauge through a gap formed by said tips and said roots of said threads.

2. The compressor unit according to claim 1, wherein said compressor is configured to compress air within a portable device.

3. The compressor unit according to claim 1, wherein said compressor has as reciprocating piston compressor with a piston driven by way of a slider crank mechanism, said slider crank mechanism including a crank wheel and a connecting rod connected to said crank wheel and said piston, and wherein said pressure gauge is assigned to a high-pressure-side outlet line of said reciprocating piston compressor and is connected to said outlet line via said threaded connection.

4. The compressor unit according to claim 1, wherein said threads have a defined thread length and said gap is defined between a tip of said thread and a root of said thread, and said gap is configured to damp pressure surges of the pressure medium flowing in said gap.

5. The compressor unit according to claim 1, wherein said threads are formed with materials having a material pairing defined to minimize or prevent corrosion.

6. The compressor unit according to claim 1, wherein an equalizing volume is formed upstream of said threaded connection in a direction of flow.

7. The compressor according to claim 1, wherein said threaded connection is formed by a threaded bolt connecting said pressure gauge with said compressor unit, and wherein, when said compressor is active, the pressure medium travels from said compressor, along said threads of said threaded bolt, to said pressure gauge.

* * * * *